US005423348A

United States Patent [19]

Jezek et al.

[11] Patent Number: 5,423,348

[45] Date of Patent: Jun. 13, 1995

[54] SHUT-IN SPRAY GUN FOR HIGH PRESSURE WATER BLAST CLEANING

[75] Inventors: Paul D. Jezek, Houston, Tex.; J. Edward Stachowiak, P.O. Box 79731, Houston, Tex. 77279

[73] Assignee: J. Edward Stachowiak, Houston, Tex.

[21] Appl. No.: 129,696

[22] Filed: Sep. 30, 1993

[51] Int. Cl.[6] .......................... F16K 39/02; B05B 1/30

[52] U.S. Cl. .......................... 137/454.6; 251/282; 251/295; 239/526; 239/586

[58] Field of Search .......................... 137/454.6; 251/282, 251/295; 239/526, 583, 586

[56] References Cited

U.S. PATENT DOCUMENTS

| | | | |
|---|---|---|---|
| 1,320,944 | 11/1919 | Thoens | 251/282 |
| 1,861,916 | 6/1932 | Hennebohle | 251/282 |
| 3,019,810 | 2/1962 | Aymar et al. | 251/295 X |
| 3,037,740 | 6/1962 | Sheps et al. | 251/282 |
| 3,272,393 | 9/1966 | Roeser | 251/295 X |
| 3,294,362 | 12/1966 | Schultz | 251/282 X |
| 4,199,132 | 4/1980 | de Mey, II | 251/282 X |
| 4,593,858 | 6/1986 | Pacht | 239/586 X |
| 5,224,686 | 6/1993 | Pacht | 251/282 |
| 5,297,777 | 3/1994 | Yie | 251/282 X |

FOREIGN PATENT DOCUMENTS

| | | | |
|---|---|---|---|
| 1650413 | 10/1970 | Germany | 251/295 |

*Primary Examiner*—John Rivell

*Attorney, Agent, or Firm*—Bush, Moseley, Riddle & Jackson

[57] ABSTRACT

In accordance with an illustrative embodiment of a high pressure water blast gun as disclosed herein, such gun includes a valve body having inlet and outlet ports and an internal chamber, and a removable valve cartridge in the chamber which includes a guide tube and a valve closure element slidably arranged in the tube. The closure element includes a leading end portion having a peripheral edge that engages an inclined seat surface in the guide tube with line contact on a first diameter, and a trailing end portion which is sealed against the guide tube on a second diameter which is greater than the first diameter to provide a hydraulic bias force that tends to close the valve against the seat. Both hand and foot operated embodiments are disclosed.

19 Claims, 2 Drawing Sheets

SHUT-IN SPRAY GUN FOR HIGH PRESSURE WATER BLAST CLEANING

FIELD OF THE INVENTION

This invention relates generally to a spray gun and valve system for directing a high pressure blast of a fluid such as water against various surfaces such as concrete, metal, and the inside of tubes and vessels in order to clean coatings, deposits, seals and other unwanted deposits therefrom. In particular the present invention relates to a gun assembly of this type which has a new and improved valve assembly and a cartridge construction that completely halts fluid flow through the gun when the actuator or trigger for the valve mechanism is released.

BACKGROUND OF THE INVENTION

To remove unwanted deposits from various surfaces as noted above, a fluid stream should be employed which has a pressure in the range of about 5,000–20,000 psi, and typically about 10,000 psi. Such high pressure fluid streams can be controlled by a spray gun device which includes a body having a high pressure outlet to discharge the high pressure stream, and a low pressure "dump" outlet that relieves much of the pressure of the outlet stream when blasting is to be discontinued. A portion of the fluid flow through the body is directed to the dump outlet by a valve mechanism which is operably responsive to a hand-operated trigger. An example of the above dump-valve blast gun system is disclosed and as claimed in U.S. Pat. No. 4,602,740 issued Jul. 29, 1986, which is incorporated herein by reference.

Although blast guns built in accordance with the above-mentioned patent have numerous advantages and desirable features, in some applications is it desirable for economic reasons to minimize the volume of cleaning fluid that is used by eliminating the low pressure dump port. In that event the high pressure fluid stream must be controlled by a valve assembly which totally halts or shuts off the flow of high pressure fluid toward the outlet when the stream is to be stopped. Such a valve should also include an actuating lever, in the form of a trigger, by which the operator holds the valve closure member open unless and until such trigger is released, at which time the closure member should seat to shut off the flow.

The above-referenced U.S. Pat. No. 4,602,740 represents a different design approach in that a bypass valve mechanism, which prohibits during flow therethrough so long as a trigger handle is operatively engaged during blasting, is dimensioned such that a hydraulic bias force tends to shift the valve element toward its open or dump position. Thus when the trigger is released by the operator for any reason, the valve automatically opens to allow blast fluid to bypass therethrough so that the pressure and flow through the outlet of the gun are reduced. However in a shut-off type gun to which the present invention relates, a hydraulic or other bias force on the closure element in the opening direction is highly undesirable because the valve may not close when the actuator lever or trigger is released by the operator.

The opening and closing of the valve element to either start or stop the high pressure flow of the blasting medium results in sliding friction and wear between the closure element and its housing. Many closure elements are housed in a body that is a large, expensive component which retains high pressures and which, as the closure element is used, undergoes a considerable amount of wear also. Although the valve closure element typically can be replaced, the body can become worn to the extent that seal rings blow out under pressure and/or higher trigger forces are needed to operate the gun. Eventually the valve body must be replaced to restore the gun to a workable, like-new conditions, which requires a very expensive overhaul thereof.

In addition to the wear on parts due to sliding movement, damage to the valve seat surface can occur when foreign particles such as sand and rust in the fluid stream erode the seat surface as a high pressure fluid stream moves therepast at high velocity. Where such seat surface is formed on the valve body, time consuming and expensive overhaul is necessary to renew the gun assembly. Thus it is highly desirable to provide a valve closure element, and a housing or guide therefor which provides the seat in the form of a cartridge assembly that can be easily removed, repaired and replaced in the field, there being little chance of any wear problems with respect to the body itself since the critical wear surfaces are on the elements of the cartridge.

An object of the present invention is to provide a new and improved shut-off type high pressure blast gun where a hydraulic bias force is developed which tends to close the valve element and shut-off flow in the absence of an opening force thereon.

Another object of the present invention is to provide a new and improved shut-off blast gun of the type described which requires low actuating force in operation to reduce operator fatigue.

Still another object of the present invention is to provide a shut-off blast gun of the type described where the valve closure and its housing from a cartridge that is replaceable as a unit so that repair is easier; faster and less expensive than prior devices and can be readily accomplished in the field.

SUMMARY OF THE INVENTION

These and other objects are attained in accordance with the present invention through the provision of a fluid blast gun assembly including a body having an inlet for a source of fluid under high pressure, a discharge outlet for the high pressure fluid, and an internal chamber arranged to removably receive a valve cartridge assembly that controls the flow of high pressure fluid between the inlet and the outlet. The cartridge assembly includes a tubular housing or guide that fits into the chamber and carries axially spaced external seal rings which prevent leakage of fluids from the body along the chamber walls, and spaced internal seals that cooperate with a valve closure member included in the assembly. An internal inclined surface on the guide provides a valve seat that is located between upper and lower flow ports through the walls of the guide, and between the upper and lower internal seals. A valve closure member is slidably received in the bore of the guide and includes a leading end portion or head coupled to a trailing end portion by a reduced diameter central portion. The valve head has a surface that is inclined at a greater angle than the seat surface to form an edge at the outer periphery thereof which has line contact with the seat when the valve member is in its closed position. The trailing end portion of the valve member has an outer diameter that is slightly greater than the diameter of the leading end portion thereof and of the line contact of such edge with the valve seat so that hydraulic pressure adjacent the valve element produce a resultant bias force that tends to shift or hold the valve head against the seat and thus shut off the flow of high pressure fluids. An additional bias force can be provided by a spring which forces the valve head toward the seat to close the valve in the closure of a hydraulic bias force.

The blast gun valve is actuated to the open position by a lever or trigger which employs mechanical advantage to overcome the bias forced and shift the valve element open when pressed by the fingers of an operator, so that the blast gun can be comfortably operated. When the operator relieves the pressure on the trigger, the valve element immediately shuts off the flow on account of being forced to the closed position by the hydraulic bias force. Since the guide, which is a part of the cartridge, remains stationary within the body during use, there is no wear on the body due to sliding friction between parts. The cartridge assembly is held in position in the body by means such as a threaded plug which is releasably coupled to the guide, so that the plug and cartridge can be readily removed and then replaced after any necessary field repairs.

BRIEF DESCRIPTION OF THE DRAWINGS

The present invention has other objects, features and advantages which will become more clearly apparent for the following detailed description of a preferred embodiment, taken in conjunction with the appended drawings in which.

DETAILED DESCRIPTION OF A PREFERRED EMBODIMENT

Figure 1:
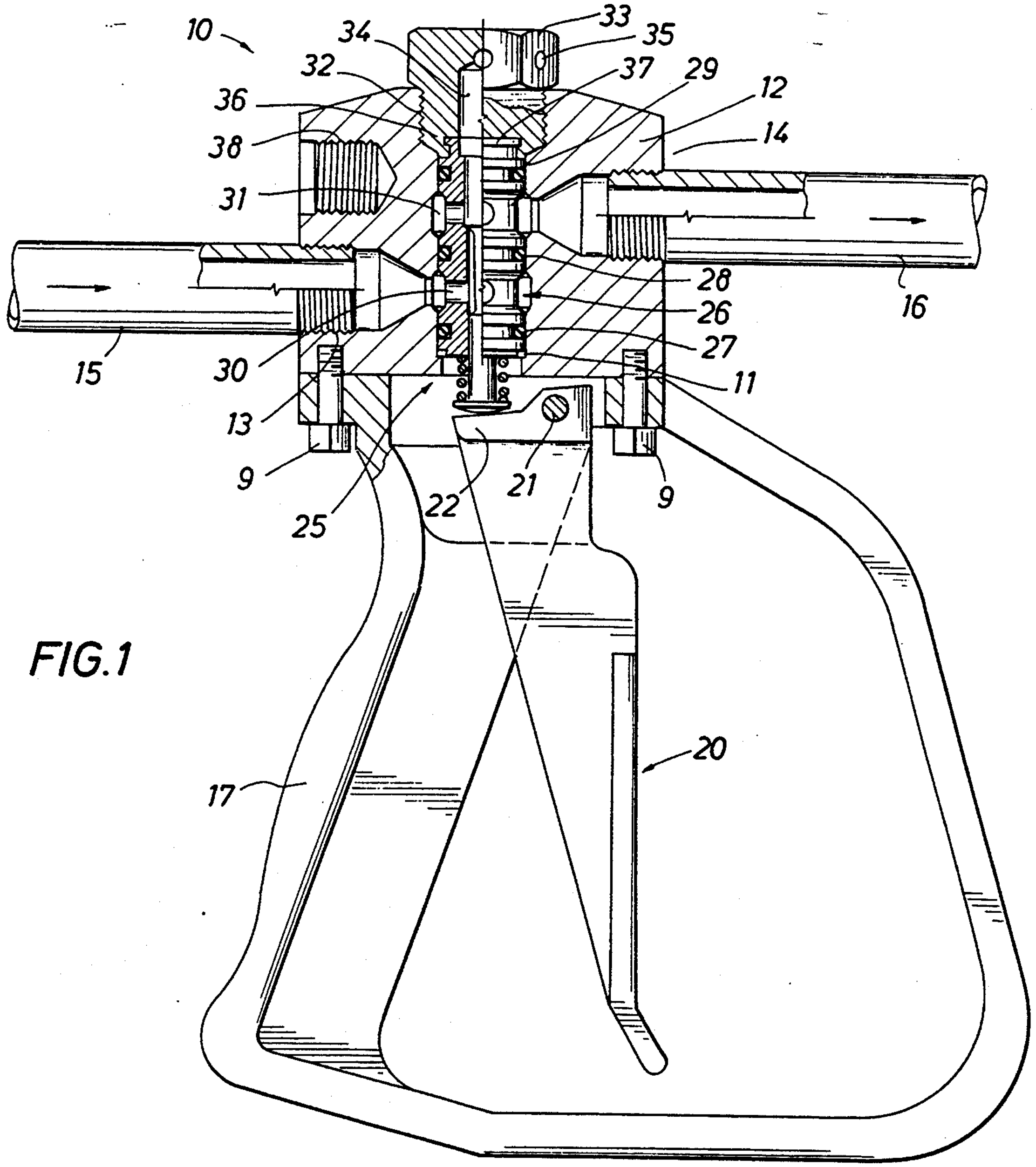
FIG. 1 is a side elevation of the fluid blast gun of the present invention, with some parts shown in cross-section.

Referring initially to FIG. 1, a fluid blast gun indicated generally at 10 includes a body 12 having an inlet 13 for a source of water under high pressure and an outlet 14 for the discharge of water under high pressure. The inlet 13 is connected by threads 15 to an inlet nipple (not shown) which has a suitable coupling at its outer end for connection to the water source, and the outlet 14 has threads 16 to attach a discharge nipple (not shown) having a nozzle assembly on its outer end which produces a jet or blast stream of water for use in various cleaning operations. A handle 17 which also provides a guard for a trigger 20 is connected to the body 12 by cap screws 9 or the like. The actuating trigger 20 is pivotally mounted on the body 12 by a pin 21, and pivots between a forward position, as shown, where fluid flow through the gun 10 is shut off and a rearward position against a stop where flow is permitted. The trigger 20 is provided with a tang 22 on its upper end which actuates a flow control valve assembly 25 to be described in detail below. The trigger 20 and the tang 22 preferably are dimensioned to provide a mechanical advantage of about 8:1 to correspondingly reduce the pressure on the trigger 20 needed to open the valve assembly 25, and to hold it open.

The valve assembly 25 is removably mounted within a bore 26 formed in the body 12, and is retained against downward movement by a stop shoulder 11. The bore 26 opens through both the top and the bottom of the body 12, and has reduced diameter seal shoulders 27–29 separated by increased diameter annular regions 30, 31 which are formed opposite the inlet and outlet ports 13, 14 respectively. The upper end portion of the bore 26 is enlarged and threaded at 32, and receives a threaded plug 33 by which the valve assembly 25 is positioned and held in the body 12, and removed therefrom when needed. The plug 33 has an internal bore 34 which is vented by several radial holes 35 to prevent pressure build-up inside same. The lower end portion of the nut 33 is coupled to the cartridge 25 by a semi-annular recess 36 therein which reconnect an annular flange 37 on the upper end of the valve cartridge 25. The flange 37 is engaged laterally within the recess 36 prior to inserting the cartridge 25 into the bore 26.

Figure 2:
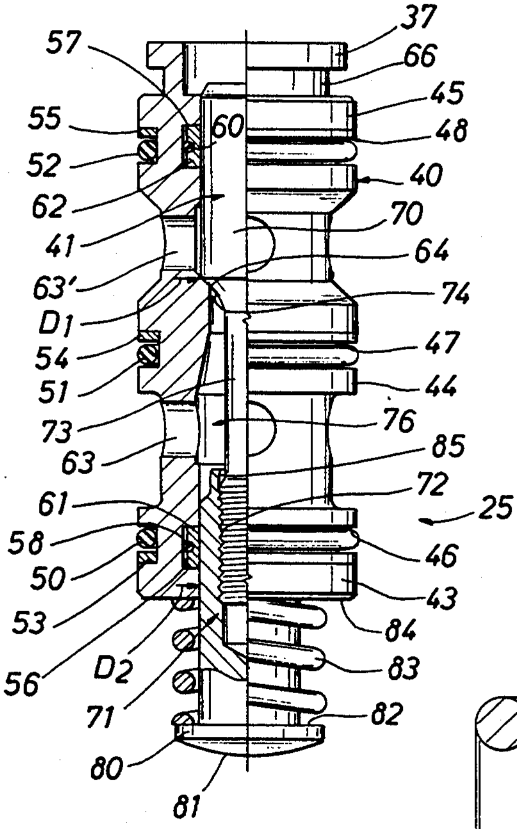
FIG. 2 is an enlarged elevational view of the valve cartridge shown in FIG. 1, the left side being shown in section.

FIG. 2 is an enlarged view which shows further structural details of the valve cartridge assembly 25. The cartridge assembly 25 includes a generally tubular housing member or guide 40 and a valve assembly 41 slidably mounted therein. The housing member 40 has axially spaced, outwardly extending shoulders 43–45 which have external annular grooves 46–48 that receive seal rings 50–52 and back-up rings 53–55. Internal annular grooves 56, 57 are formed inside the shoulders 43 and 45 and receive seals 58, 60 which preferably are mounted on plastic rings 61, 62 that enable very low friction and sliding movement of the valve assembly 41 therethrough. A first plurality of angularly spaced flow ports 63 extend through the wall of the guide 40 between the shoulders 43 and 44, and a second plurality of angularly spaced flow ports 63' extend through such wall between the shoulders 44 and 45. A frusto-conical wall surface 64 is formed inside the body 40 adjacent the shoulder 44 and provides an inclined valve seat which cooperates with an edge on the valve assembly 41 in the closed position thereof to shut off fluid flow as will be explained in further detail below. The upper end of the body 40 is provided with a neck 66 which has the outwardly directed flange 37 formed integrally therewith. The flange 37 cooperates with the lower end of the threaded plug 33 to enable the cartridge assembly 25 to be inserted into, and removed from the bore 26 of the spray gun body 12 as disclosed above.

Figure 3:
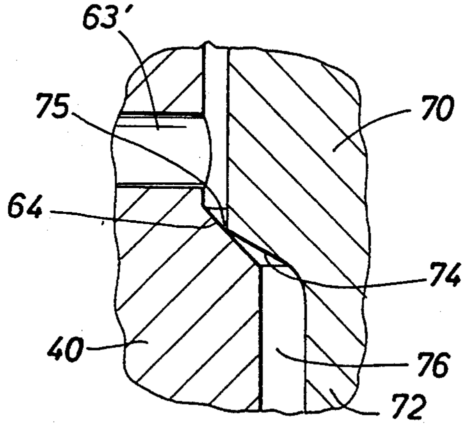
FIG. 3 is a further enlarged, fragmentary view of parts of the valve head and the seat.

The valve closure member 41 includes a cylindrical leading portion or head 70, a cylindrical trailing member 71, and a reduced diameter central portion 72. The lower end of the central portion 72 is threaded at 73 to the trailing member 71 so that the head 70, the portion 72 and the trailing member 71 form a unitary assembly. The lower side of the head portion 70 has an inclined lower surface 74 that is formed on a slightly steeper angle with respect to the longitudinal axis of the closure member than the seat surface 64 as shown in FIG. 3, so that the outermost edge 75 of the head 70 engages the seat surface with a line contact when the valve is closed as shown in the drawings. The diameter $D_1$ of such line contact (FIG. 2) is slightly less than the diameter $D_2$ of engagement of the seal 61 with the outer diameter of the trailing valve element portion 71 so that when high pressure fluid is present in the annular region 76 that surrounds the neck 72 of the valve closure member 41, a hydraulic bias force is generated which tends to hold the member in its closed position.

The trailing portion 71 of the closure element 41 includes an outwardly directed flange 80 on its lower end which provides a rounded or domed surface 81 that is engaged by the tang 22 of the actuator trigger 20. The upper side 82 of the flange 80 is engaged by the lower end of a coil spring 83 whose upper end presses against the lower face 84 of the cartridge housing 40. The spring 83 provides an additional bias force that tends to hold the valve closure element 41 in its closed position, primarily when the gun 10 is not in operation. A skirt 85 can be formed on the upper end of the trailing portion 71 which extends parallel to the axis of the member 71 until after the threads 73 are made up. Then a suitable punch or other tool can be inserted through the flow ports 63 in order to crimp the skirt 85 inward above the threads in order to positively prevent them from unthreading during use.

A blind bore 38 on the upper side of the body 12 has threads 39 to attach a tube (not shown) having a shoulder rest mounted on its outer end. Such rest allows the user's shoulder to comfortably absorb reaction forces while the blast gun 10 is in operation. Although not shown in the drawing, a stub pipe which is screwed with another blind bore on the left side of the body 12 can be grasped by the other hand of the operator to further stabilize the gun in use.

OPERATION

In use, the spray or blast gun 10 is assembled as shown in the drawings, and a source of high pressure fluid is connected to the inlet line 15 by a suitable coupling (not shown). So long as the trigger 20 is not depressed or pivoted rearward, the valve assembly 25 blocks fluid communication between the inlet port 13 and the outlet port 14 which has the tube 16 and nozzle (not shown) connected thereto. The hydraulic bias force acting downward on the valve closure member 41, as supplemented by the bias force of the spring 83, holds the valve head 70 in its closed position with a resultant force that increases with increasing pressures.

To open the closure member 41 so that blasting operations can commence, the trigger 20 is pressed rearward to cause the tang 22 on the upper end thereof to pivot upward about the pin 21. Such movement forces the closure element 41 upward in the guide 40 and disengages the edge 75 from the seat surface 64 in order to place the inlet port 13 in communication with the outlet port 14 via the flow ports 63, 63' and the annular region 76 between the center valve element portion 72 and the surrounding inner surfaces of the guide 40. Since the diameter $D_1$ is less than the diameter $D_2$, the pressure of fluids produces a downwardly directed hydraulic bias force on the valve element 41 which tends to return the same to its closed position, such force being determined by the following formula:

$$F = P \cdot \frac{(D_2^2 - D_1^2)}{4} \cdot \pi$$

Where F=force in lbs.

P=pressure in lbs. per $\text{inch}^2$, $D_2$=diameter of trailing portion 71 in inches;

$D_1$=diameter of leading portion 41 or line contact 75 in inches;

$\pi$=a constant of approximately 3.1416

However the actuating force on the trigger 20 and the mechanical advantages provides for a net opening force that is low enough to prevent operator fatigue in normal operations. The coil spring 83 also contributes a closing force, however its force is present primarily to maintain the valve closed when not in use.

As an example of the bias forces, but not by way of limitation, the difference between the diameters $D_1$ and $D_2$ can be about 0.006–0.008 inches, and the parts are sized such that each 0.001 inch of diameter difference results in approximately 10 lbs. of closing force at an operating pressure of 10,000 psi. In view of the mechanical advantages provided in the design of the trigger 20, only about 5–7 lbs. of rearward force on it is sufficient to maintain the valve closure element 41 open, or to open it once the edge 75 has been closed against the seat 64.

Although the coil spring 83 has been disclosed as a means to supplement the bias force in the closing direction .on the valve 41, its primary function is to maintain the valve closed when not in use. Such spring can be considered to be unnecessary to the overall operation of the gun 10, and may be omitted. However the spring 83 will ensure that the valve 41 is closed in the absence of fluid pressure at the inlet port 13, or at very less pressure.

From the foregoing, it will be recognized that since any wear due to sliding friction is confined to the cartridge assembly 25 and its component parts, the likelihood that the valve body 12, which is a large and expensive part, will experience wear to the point of needing replacement is quite remote. On the other hand the cartridge 25 can be easily removed from the body 12 and its various parts renewed or replaced very easily by simply removing the threaded plug 33 and pulling the cartridge 25 out of the body 12. Thus the blast gun 10 lends itself to field repair which is a significant advantage.

The hydraulic bias afforded by the structural relationship of the parts of the present invention forces the valve closure element 41 toward its closed position at all times during blasting operations. Thus any time that actuating pressure on the trigger is released, either purposely or accidentally, the valve will automatically close and stop the flow of high pressure blast fluids. The valve seat 64 is made integral with the housing 40 so that precise coaxial alignment of the bore and seat can be formed during manufacture. The valve closure element 41 also has both its seal diameters and its seat machined in one operation for precise coaxial alignment.

Figure 4:
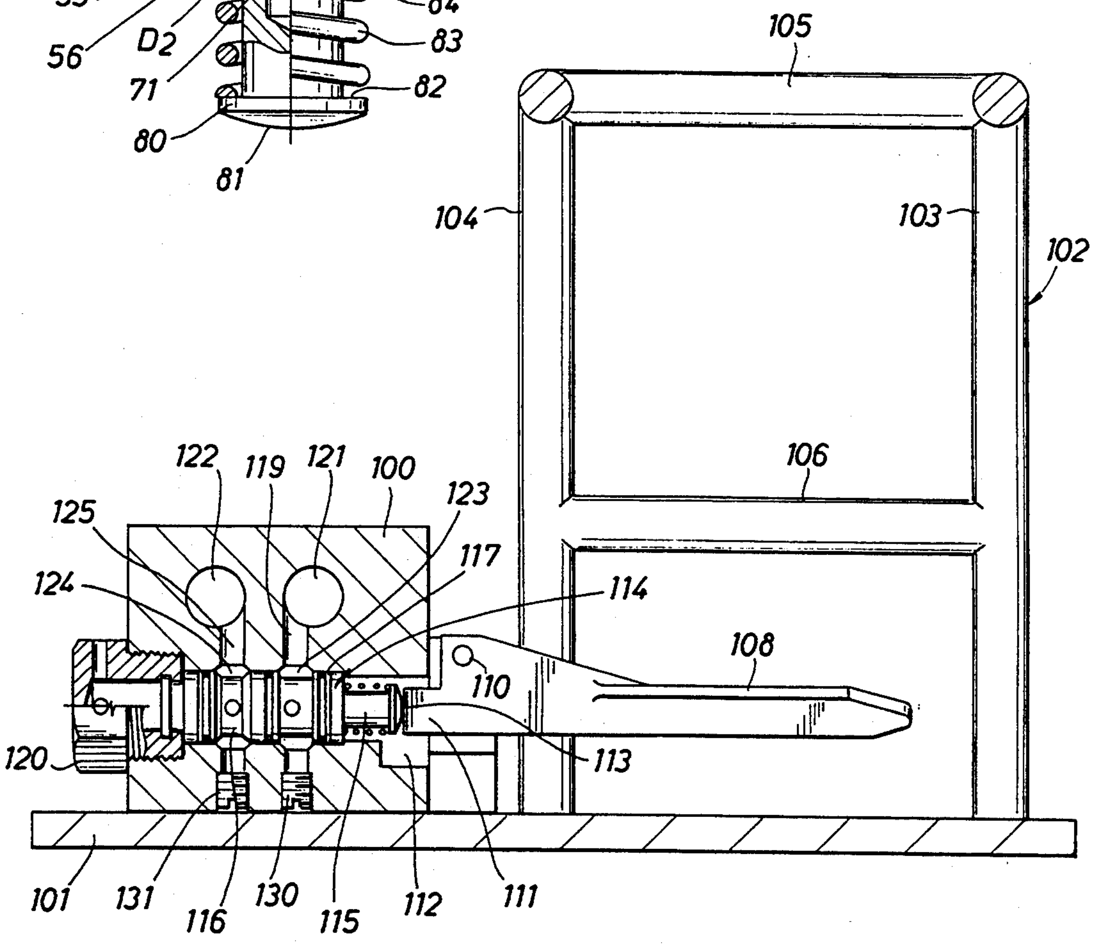
FIG. 4 is a view similar to FIG. 1 of another embodiment of the present invention.

Another embodiment of the present invention which is adapted to be actuated by the foot of the operator rather than by hand is shown in FIG. 4. Here the valve body 100 is mounted in a secure manner on a base plate 101 which extends well to the rear of the body. An upstanding cage indicated generally at 102 having front and rear U-shaped members 103, 104 connected by cross members 105–107 provides a skeletal enclosure for an actuating pedal or lever 108 which is pivoted to the body 100 by a pin 110. A tang 111 on the inner end of the pedal 108 extends into a recess 112 in the body 100 where the end surface 109 thereof engages the head 113 of the valve closure element 115 of the cartridge assembly 114. The cartridge assembly 114 includes the closure element 115, and a ported housing member 116 which is received in a longitudinal housing bore 117. The cartridge assembly 114 is identical to that described above respecting FIGS. 1–3 and thus need not be described again in detail. As in the previous embodiment, the cartridge assembly 114 is removably held in place in the body bore 117 of a vented nut 120.

The valve body 100 is provided with a transverse threaded inlet 121 and a transverse threaded outlet 122 to which a source of fluid under pressure and a spray nozzle are respectively attached. The inlet 121 is connected to recessed region 123 of the bore 117 by a port 119, and the outlet 122 is similarly connected to the body region 124 by a port 125. Ports 126, 127 leading from these regions to the outside of the body 100 are closed off by plugs 130, 131.

The embodiment shown in FIG. 4 operates in essentially the same manner as the previous embodiment except that the assembly is placed on the floor and the toe portion of the operator's boot is used to press down on the pedal 108 to shift the closure element 115 forward in the housing 116 and thereby communicate the inlet and outlet ports 121,122. A forward acting bias force on the closure element 115, as described above, tends to return the closure element to its rearward or closed position. Thus any time the foot of the operator is removed from the pedal 105, either purposely or otherwise, the valve element 115 automatically closes and shuts off high pressure flow. Both embodiments have a "fail-safe" operation in this regard.

It now will be recognized that a new and improved shut-off blast gun has been disclosed which meets all of the objections of the present invention, and which incorporates numerous unique features and advantages as set forth herein. Since certain changes or modifications may be made in the disclosed embodiment without departing from the inventive concepts involved, it is the aim of the appended claims to cover all such changes and modifications falling within the true spirit and scope of the present invention.

What is claimed is:

1. Valve apparatus for use in a high pressure fluid blast cleaning operations, comprising: a body having an inlet for a source of fluid under high pressure and an outlet for the discharge of fluid under high pressure, said body having a bore communicating said inlet and said outlet; tubular guide means removably positioned in said bore and defining a valve seat; valve means positioned in said guide means and having a closure element movable longitudinally between a closed position where said element engages said seat to shut off flow between said inlet and outlet and an open position where said element is spaced from said seat to permit flow from said inlet to said outlet; hydraulically operable means including a resultant transverse area of said valve means responsive to said pressure for biasing said valve means toward said closed position, said biasing means being defined in part by a first diameter of engagement of said closure element with said seat and a second diameter of sealing contact between said valve means and said guide means, said first diameter being less than said second diameter to provide said resultant transverse area so that said pressure generates force which tends to shift said closure element against said seat; and actuating means for shifting said valve means to said open position.

2. The apparatus of claim 1 wherein closure element and said seat are shaped to provide annular line contact therebetween.

3. The apparatus of claim 1 wherein said seat is formed by an inclined surface and said valve element has an inclined surface with a greater inclination angle than said seat, so that said valve element has an annular edge which engages said seat surface with line contact.

4. The apparatus of claim 1 wherein said guide means has first flow port means below said seat for communicating said inlet with the interior thereof and second flow port means above said seat for communicating said interior with said outlet.

5. The apparatus of claim 1 further including means releasably connected to said body for positioning said guide means and said valve means in said bore and for removing same from said bore.

6. The apparatus of claim 5 wherein said positioning and removing means includes a plug member threaded into said body in coaxial alignment with said bore, said plug member having means on the inner end thereof for releasable connection with said guide means.

7. The apparatus of claim 1 further including supplemental means for biasing said valve means toward said closed position.

8. The apparatus of claim 7 wherein said supplemental biasing means includes a coil spring reacting between said guide means and said valve means.

9. A valve cartridge assembly for use in a high pressure water blast gun, comprising: a generally tubular guide member having axially spaced flow ports and an internal inclined seat surface arranged between said flow ports; and a valve element slidably positioned in said guide member, said valve element including a head portion having sealing contact with said guide member and adapted to engage said seat to prevent fluid flow through said blast gun, said valve element further including a trailing portion having an outer surface that is sealed with respect to said guide member on a diameter that is greater than the diameter of said sealing contact of said head portion, the difference in transverse areas defined by said diameters producing a hydraulic bias force which tends to shift said valve head against said seat.

10. The valve cartridge assembly of claim 9 wherein said head portion and said trailing portion are joined together by a reduced diameter center portion whose external walls together with internal walls of said guide member define a flow path between said axially spaced flow ports.

11. The valve assembly of claim 10 further including threaded connector means between said trailing portion and said central portion; outwardly directed shoulder means on said trailing portion; and spring means reacting between said shoulder means and said guide member providing a mechanical bias force which acts in the same direction as said hydraulic bias force and also tends to close said valve element against said seat.

12. The valve assembly of claim 11 further including connection means on said guide member; and releasable means attached to said connector means to enable said valve assembly to be positioned in and removed from an associated valve body.

13. A valve closure element for use in a high pressure water blast gun, comprising: a cylindrical leading portion and a cylindrical trailing portion connected to one another by a reduced diameter central portion, said leading portion providing a valve head and having an outer diameter; means on said valve head adapted to engage a seat surface to prevent fluid flow, said trailing portion having an outer diameter that is greater than said outer diameter of said leading portion to define a differential area on which pressures can act to force said valve head against the seat.

14. The valve closure element of claim 13 including thread means for rigidly connecting said trailing portion to said central portion.

15. The valve closure element of claim 14 further including deformable means for preventing unthreading of said thread means.

16. The valve closure element of claim 13 when said trailing portion has an outwardly directed shoulder thereon adapted to be engaged by a spring means which provides a supplemental bias force to said valve closure element.

17. Valve apparatus for use in a high pressure fluid blast cleaning operation, comprising: a valve body having an inlet for a source of fluid under high pressure and an outlet for the discharge of fluid under high pressure, said body having a bore communicating said inlet and said outlet; tubular guide means removably positioned in said bore and defining a valve seat; valve means positioned in said guide means and movable between a closed position where said element engages said seat to shut off flow between said inlet and outlet and an open position where said element is spaced from said seat to permit flow from said inlet to said outlet; hydraulically operable means including a resultant transverse area of said valve means for biasing said valve means toward said closed position in response to pressure at said inlet, said resultant transverse area being defined in part by a first, lesser diameter of engagement of said valve means with said guide means and a second, greater diameter of sealing contact of said valve means with said guide means; and foot-operated means for shifting said valve means to said open position against the bias of said hydraulically operable means.

18. The apparatus of claim 17 wherein said valve body is mounted on a plate means that is arranged to rest on a floor surface, and wherein said foot-operated means is a longitudinally extending pedal pivoted for movement in a vertical plane at its inner end to said body.

19. The apparatus of claim 18 further including cage means for protecting said pedal against accidental operation.

* * * * *